United States Patent
Tatarczuk

(10) Patent No.: US 6,345,980 B1
(45) Date of Patent: Feb. 12, 2002

(54) GAS BOLT HEATER

(76) Inventor: George Tatarczuk, 9048 Haldi Road, Prince George, British Columbia (CA), V2N 6J9

( * ) Notice: Subject to any disclaimer, the term of this patent is extended or adjusted under 35 U.S.C. 154(b) by 0 days.

(21) Appl. No.: 09/624,979

(22) Filed: Jul. 25, 2000

Related U.S. Application Data

(63) Continuation-in-part of application No. 09/548,429, filed on Apr. 12, 2000, now abandoned.

(51) Int. Cl.[7] .............................................. F23D 14/28
(52) U.S. Cl. ................ 431/344; 431/351; 126/271.2 R; 126/231; 126/233
(58) Field of Search ....................... 126/271.1, 271.2 R, 126/271.2 C, 249, 229, 226, 231, 233; 431/350–354, 344, 345; D23/314; 219/205, 200, 221

(56) References Cited

U.S. PATENT DOCUMENTS

| | | | | |
|---|---|---|---|---|
| 4,738,242 A | * | 4/1988 | Hart | 126/271.1 |
| 4,762,488 A | * | 8/1988 | Schilling | 431/350 |
| 5,213,494 A | * | 5/1993 | Jeppesen | 126/271.2 R |
| 6,105,471 A | * | 8/2000 | Takayuki | 81/57.38 |

FOREIGN PATENT DOCUMENTS

| | | | | |
|---|---|---|---|---|
| JP | 54-142631 | * | 11/1979 | 431/351 |
| JP | 64-27824 | * | 1/1989 | 431/351 |

OTHER PUBLICATIONS

Gas Bolt Heater (drawing, description, operating instructions and parts list) 4 pages, no date, American Analog Co. Inc., Houston, Texas, U.S.A.

* cited by examiner

*Primary Examiner*—James C. Yeung

(57) ABSTRACT

A gas bolt heater for loosening large bolts and studs has a hollow cylindrical housing defining a cylindrical chamber within the housing. A heating tube projecting from one end of the housing has a longitudinal bore. A first cylindrical insert closing the lower end of the chamber has a through opening communicating with the bore of the heating tube, and a second cylindrical insert located within an opposite end of the cylindrical housing has an elongate passage extending axially of the cylindrical housing. Downwardly convergent air passages in the second cylindrical insert have mouths distributed around the elongate passage, at a lower end of the passage, and an air supply duct communicates through the cylindrical housing with the air outlet passages. In use, air jets discharge from the mouths of the air outlet passages around an outlet end of a tip of an oxy-acetylene torch inserted through the elongate passage so that the flame of the oxy-acetylene torch is directed longitudinally of the cylindrical chamber and does not impinge directly on the wall of housing. The useful life of the gas bolt heater is thereby substantially extended.

13 Claims, 4 Drawing Sheets

GAS BOLT HEATER

CROSS-REFERENCE T RELATED APPLICATION

This is a continuation-in-part of patent application Ser. No. 09/548,429, filed Apr. 12, 2000, now abandoned.

BACKGROUND OF THE INVENTION

1. Field of the Invention

The present invention relates to gas bolt heaters and, more particularly, to gas bolt heaters which are intended for use in tightening and loosening studs and bolts.

2. Description of the Related Art

The tightening of large studs and bolts in machinery, for example in turbines, heat exchangers, compressors and pumps, is often extremely difficult and time-consuming since such bolts and studs are subjected to high temperatures in use and, therefore, must be heated to expand them to enable them to be sufficiently tightened during assembly of the machinery or to be loosened during disassembly of the machinery. Since the machinery is required to be periodically disassembled for maintenance and for routine inspection for insurance purposes, and since it is necessary to remove the studs and bolts for this purpose, it is highly desirable to be able to heat them so as to cause them to be longitudinally extended to facilitate loosening of them.

It has, therefore, previously been proposed to provide bolt heaters for heating the studs and bolts. Prior art bolt heaters include electric heaters, which are slow in operation, and gas bolt heaters.

Prior art gas bolt heaters employ an oxy-acetylene torch to provide a flow of hot gases through a hollow core of a stud or a bolt.

However, it has been found, in practice, that it is a substantial disadvantage of such prior art gas bolt heaters that the flame from the tip of the oxy-acetylene torch can impinge on and damage the heater.

BRIEF SUMMARY OF THE INVENTION

According to the present invention, there is provided a gas bolt heater having a hollow cylindrical housing defining a cylindrical chamber within the housing, a heating tube projecting from one end of the housing and having a longitudinal bore extending through the heating tube, a first cylindrical insert closing the lower end of the chamber and located in one end of the housing, the first cylindrical insert having a through opening communicating with the bore of the heating tube, and a second cylindrical insert located within an opposite end of the cylindrical housing at an upper end of the chamber, the second cylindrical insert having an elongate passage extending axially of the cylindrical housing through the second cylindrical insert. A plurality of downwardly convergent air passages in the second cylindrical insert have mouths distributed around the elongate passage, at a lower end of the passage, and an air supply duct communicates through the cylindrical housing with the air outlet passages.

When the gas bolt heater according to the present invention is in use, air jets discharge from the mouths of the air outlet passages around an outlet end of a tip of an oxy-acetylene torch inserted through the elongate passage. In this way, the flame of the oxy-acetylene torch is directed longitudinally of the cylindrical chamber, so that the flame does not impinge directly on the wall of housing. The useful life of the gas bolt heater is thereby substantially extended.

In a preferred embodiment of the invention, the elongate passage is dimensioned to snugly receive therethrough the tip of the oxy-acetylene torch and has a length sufficient to hold the tip so that the tip is co-axial with the cylindrical chamber. In this way, the oxy-acetylene torch tip is held so that the flame of the torch extends along the axis of the cylindrical chamber, thus further counter-acting damage to the wall of the chamber by the flame.

Also, the through opening of the first cylindrical insert, in the preferred embodiment of the invention, includes an outwardly open, downwardly convergently tapered mouth, which may be frusto-conical in shape, and which facilitates flow of the hot gases from the chamber through the elongate passage and into the heating tube with reduced turbulence.

It has been found to be highly advantageous to provide a cooling air supply for cooling the torch tip, since such cooling substantially increases the useful life of the torch tip. Accordingly, a cooling air duct is connected to an upper end of the housing, which is provided with an air outlet communicating with the cooling air supply duct, and the air outlet is directed to discharge cooling air onto the torch tip.

BRIEF DESCRIPTION OF THE DRAWINGS

The invention will be more readily apparent from the following description of a preferred embodiment thereof given, by way of example, with reference to the accompanying drawings, in which:FIG.

DESCRIPTION OF THE PREFERRED EMBODIMENTS

Figure 1:
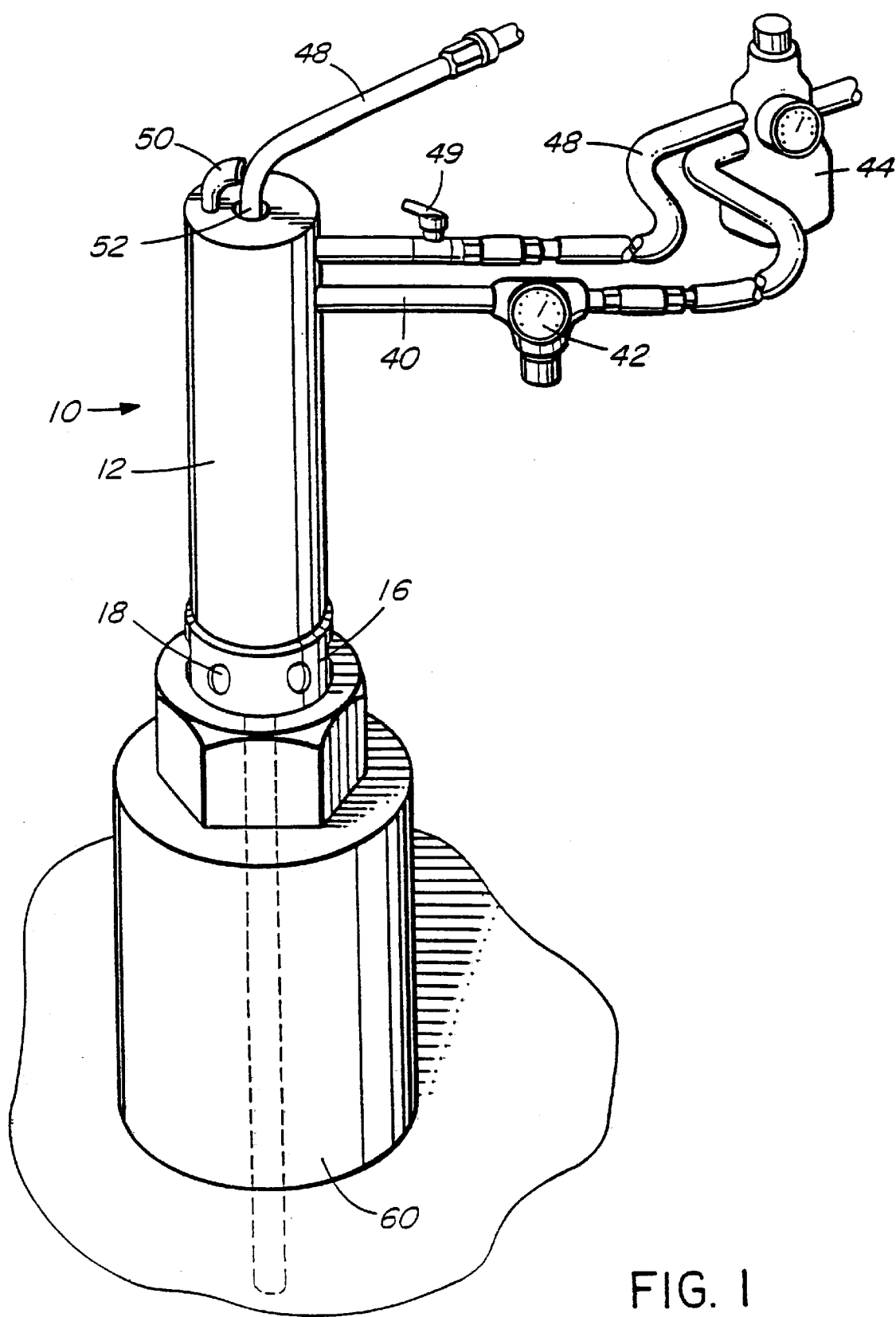
FIG. 1 shows a view in perspective of a gas bolt heater according to a preferred embodiment of the invention.

In the accompanying drawings, reference numeral 10 indicates generally a gas bolt heater according to the preferred embodiment of the invention.

The gas bolt heater 10 has a cylindrical housing 12, defining a cylindrical chamber 14 in the interior of the housing. Also, the housing 12 has, at a lower end of the housing 12, a cylindrical skirt 16 formed with gas outlet openings 18 distributed around the cylindrical skirt 16.

Within the cylindrical housing 12 there is provided, at a lower end of the chamber 14 and the housing 12, a first cylindrical insert 20 and, at an upper end of the chamber 14, an upper cylindrical insert 22.

The lower cylindrical insert 20 is formed with an axial through opening 2 having an upwardly open, downwardly convergently tapered mouth 26. The through opening 24 communicates with a longitudinal passage 28 extending through a heating tube 30, which projects from the lower end of the housing 12 and which has an upper end in threaded engagement with the first cylindrical insert 20.

The second cylindrical insert 22 is formed with an elongate passage 32, which extends axially through the second cylindrical insert 22 and the lower end of which opens into the chamber 14.

The second cylindrical insert 22 is formed with a plurality of downwardly convergent air outlet passages 34, which at their lower ends have mouths 36 (FIG. 2) distributed around the lower end of the elongate passage 32 and which, at their upper ends, communicate with an annular recess 38 formed in the cylindrical periphery of the second cylindrical insert 22. A first air supply pipe or duct 40, having one end extending in threaded engagement with and through the wall of the housing 12 at the upper end of the housing 12, communicates with the annular recess 3 8. The air supply pipe 40 is provided with an adjustable low pressure regulator 42 and an adjustable high pressure regulator 44 for controlling the supply of air through the air outlet passages 34 to the annular recess 38.

A further annular recess 46 in the periphery of the second annular insert 22 communicates with a cooling air supply pipe or duct 48 and, through a duct 51 formed in the upper cylindrical insert 22 and the inner surface of the cylindrical housing 12, with an outlet pipe 50. The cooling air supply pipe or duct 48 is provided with an adjustable valve 49 and is connected to the high pressure regulator 44.

Figure 2:
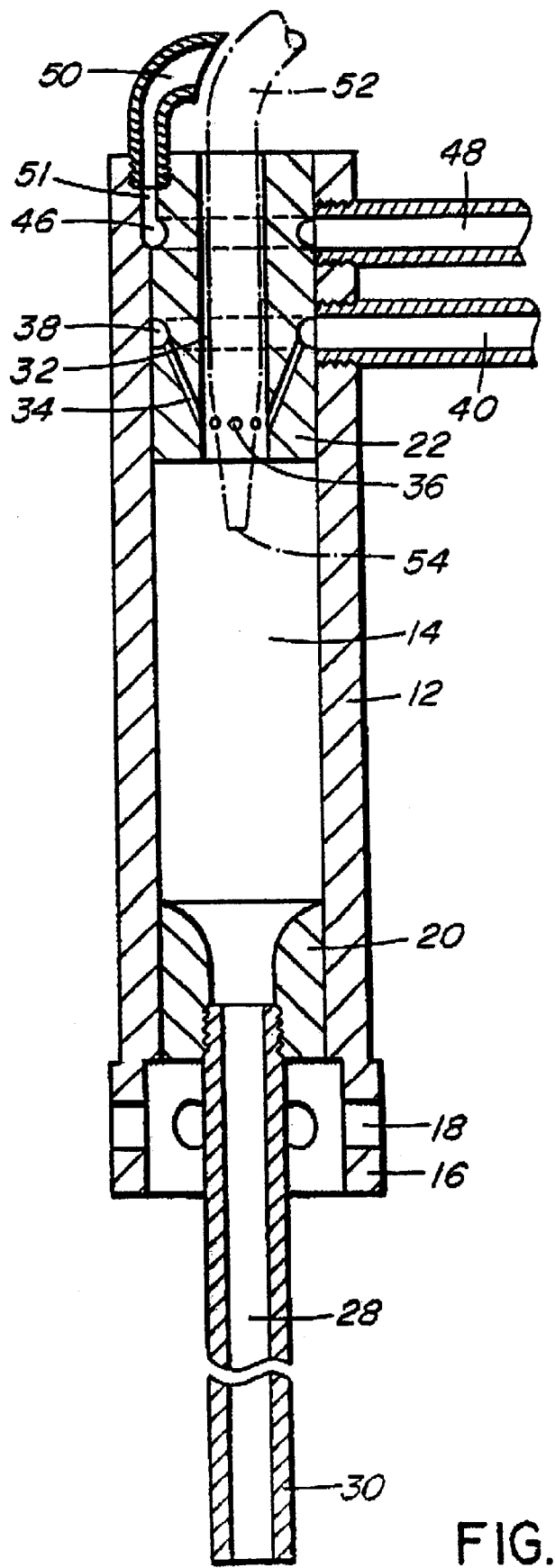
FIG. 2 shows a view taken in vertical cross-section through the gas bolt heater of FIG. 1.

The elongate passage 32 of the second cylindrical insert 22 is dimensioned to snugly receive a tip 52 of an oxy-acetylene torch (not shown). The torch tip 52 has a tapered outlet end 54 which, as shown in FIG. 2, extends past the air outlet passage mouths 36.

Figure 3:
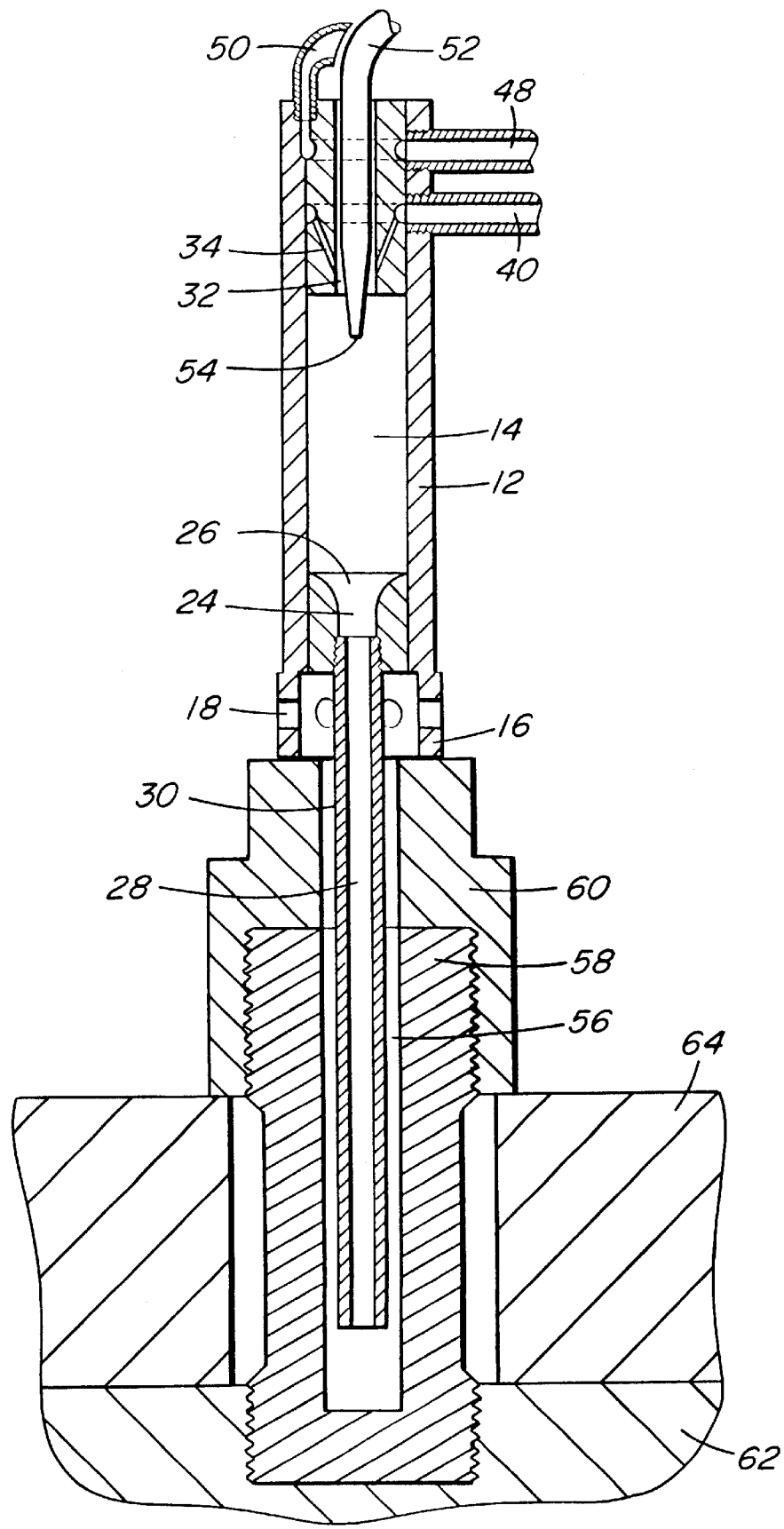
FIG. 3 shows a view taken in cross-section, similar to that of FIG. 2, but showing the gas bolt heater installed on a stud on a piece of machinery.

When the gas bolt heater 10 is in use, as illustrated for example in FIG. 3, the heating tube 30 is firstly inserted downwardly through a bore 56 forming a hollow core of a stud 58 and its stud head 60. The stud 58 is shown, in FIG. 3, in threaded engagement with the stud head 60 and with a machine flange 62, with the stud 58 extending through a second machine flange 64 for securing the flanges 62 and 64 to one another.

The oxy-acetylene torch tip 52 is then inserted downwardly through the elongate passage 32 in the second cylindrical insert 22, and the snug fit of the tip 52 in the passage 32 ensures that the tip is held so that it is co-axial with respect to the housing 12 and the chamber 14.

Air supplied through the air supply pipe 40 is discharged from the air outlet passages 34 through the mouths 36, which are distributed around the lower end 54 of the tip 52, so that the air is discharged downwardly along the lower end 54 of the tip 52 and, thus, causes the flame (not shown) of the oxy-acetylene torch to be directed axially downwardly with respect to the chamber 14.

The high pressure regulator 44 is adjusted to supply an air pressure of about 50–60 psi to the low pressure regulator 42, which is adjusted to supply an air pressure of up to 3 psi to the air outlet passages 34. By using the two pressure regulators 44 and 42 in this manner, the pressure supplied to the air outlet passages 34 can be carefully controlled in order to operate the apparatus efficiently.

The axial holding of the tip 52 by the second cylindrical insert 22 and the discharge of air from the air outlet passage mouths 36 both assist in directing the flame of the oxy-acetylene torch axially of the chamber 14 towards the mouths 26 of the through passage 24 and, thus, into the longitudinal passage 28 of the heating tube 30, so that the flame is not directed against the wall of the chamber 40, which would damage the wall of the chamber 14.

Also, the downwardly convergent tapering of the mouth 26 facilitates flow of the hot gases from the chamber 14 into the longitudinal passage 28 without undue turbulence.

The hot gas flowing downwardly through the heating tube 30 issues from the lower end of the latter, within the bore 56, and then flows upwardly along the bore 56, around the exterior of the heating tube 30, thus effectively heating the stud 58 and its stud head 60. On passing upwardly from the bore 56, the hot gases are discharged laterally through the gas outlet openings 18 in the skirt 16 of the housing 12.

Cooling air passing from the pipe 48 to the outlet pipe 50 is discharged by the outlet pipe 50 onto the exterior surface of the torch tip 52 for cooling the latter. This cooling substantially increases the useful life of the torch tip 52.

The housing 12 is preferably made of titanium, to provide good heat resistance, and the remaining components of the gas bolt heater 10 are made of stainless steel.

Figure 4:
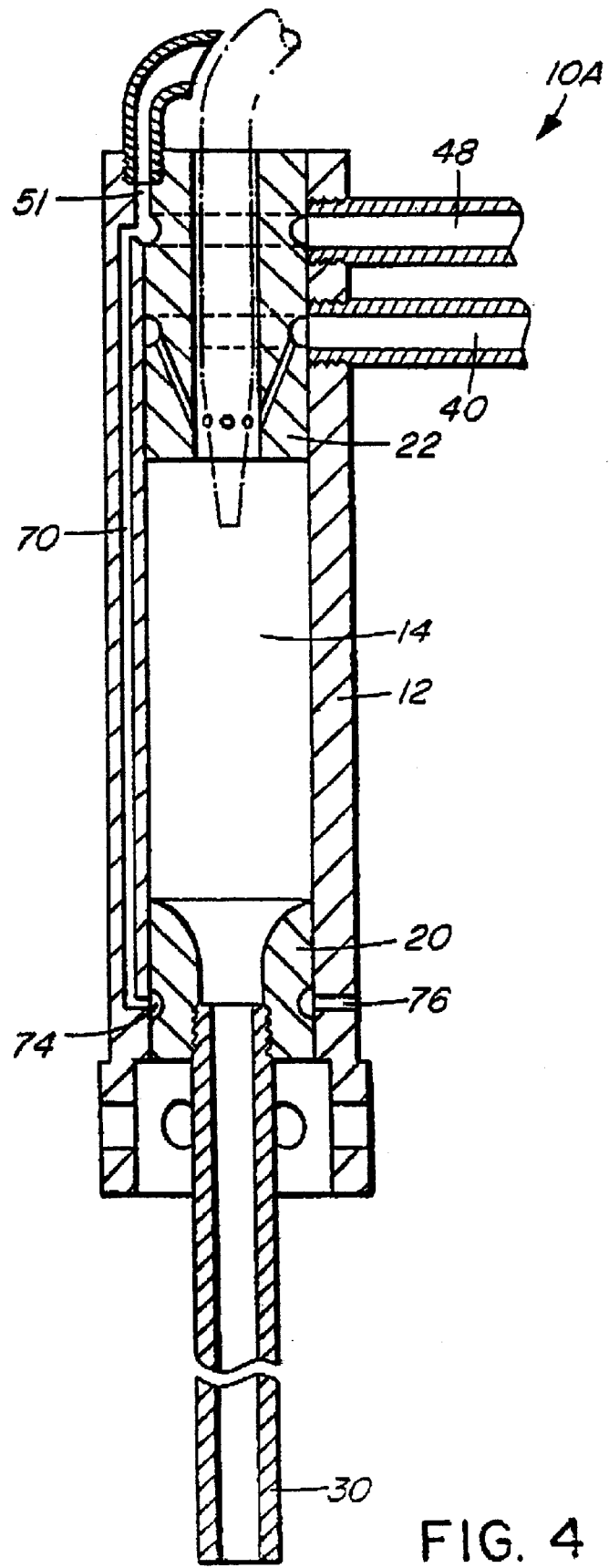
FIG. 4 shows of view corresponding to that of FIG. 2 but illustrating a modification of the gas bolt heater of FIG. 2.

In FIG. 4, which shows a gas bolt heater indicated generally by reference numeral 10A, parts which correspond to those of FIGS. 1 to 3 are, for convenience, indicated by the same reference numerals.

The gas bolt heater 10A of FIG. 4 is a modification of the gas bolt heater 10 of FIG. 2 and has a cooling air flow passage 70 extending longitudinally of the cylindrical housing 12, through the wall of the cylindrical housing 12, from the duct 51 to an annular recess 74 in the lower cylindrical insert 20.

The annular recess 74 extends around the lower cylindrical insert 20 and communicates through an outlet passage 76 with the atmosphere at the exterior of the cylinddrical housing 12, the outlet passage 76 extending radially through the wall of the cylindrical housing 12 at the side of the latter opposite from the air flow passage 70.

By supplying cooling air from the cooling air supply pipe 48 through the cooling air flow passage 70 to the annular recess 74, the lower end of the gas bolt hater 10A, as viewed in FIG. 4, is cooled and is thereby prevented from overheating. Therefore, when the gas bolt heater 10A is substituted for the gas bolt heater 10 in the assembly of FIG. 3, the maximum heating of the stud 58 therefore occurs at the midsection of the heating tube 30, between the lowermost end of the heating tube 30 and the cylindrical skirt 16 of the gas bolt heater 10A.

I claim:

1. A gas bolt heater, comprising:
   a hollow cylindrical housing;
   said housing defining a cylindrical chamber within said housing;
   a heating tube projecting from one end of said housing;
   said heating tube having a longitudinal passage extending through said heating tube;
   a first cylindrical insert closing a lower end of said cylindrical chamber;
   said first cylindrical insert being located in said one end of said cylindrical housing and having a through opening communicating with said longitudinal passage of said heating tube and with said cylindrical chamber;
   a second cylindrical insert located within an opposite end of said cylindrical housing at an upper end of said cylindrical chamber;
   said second cylindrical insert having an elongate passage extending axially of said cylindrical housing through said second cylindrical insert;
   a plurality of downwardly convergent air outlet passages in said second cylindrical insert;
   said air outlet passages having mouths distributed around said elongate passage at a lower end of said elongate passage; and
   an air supply duct communicating through said cylindrical housing with said air outlet passages.

2. A gas bolt heater as claimed in claim 1, wherein said elongate passage is dimensioned to snugly receive therethrough a tip of an oxy-acetylene torch and has a length sufficient to hold said tip co-axial with said cylindrical chamber.

3. A gas bolt heater as claimed in claim 1, wherein said through opening of said first cylindrical insert includes an upwardly open, downwardly convergently tapered mouth.

4. A gas bolt heater as claimed in claim 1, wherein said air supply duct is provided with a high pressure regulator and a low pressure regulator.

5. A gas bolt heater as claimed in claim 1, further comprising a cooling air duct connected to said upper end of said housing.

6. A gas bolt heater as claimed in claim 5, further comprising an air outlet at said upper end of said housing, said air outlet communicating with said cooling air duct through said housing and being directed to discharge cooling air onto a tip of an oxyacetylene torch inserted through said elongate passage.

7. A gas bolt heater, comprising:

a hollow cylindrical housing;

said housing having an upper end and a lower end and defining a cylindrical chamber within said housing;

a heating tube projecting from said lower end of said housing;

said heating tube having a longitudinal passage extending through said heating tube;

a first cylindrical insert closing said chamber at said lower end of said housing;

said first cylindrical insert having a through opening communicating with said longitudinal passage of said heating tube;

a second cylindrical insert located within an opposite end of said cylindrical housing at an upper end of said chamber;

said second cylindrical insert having an elongate passage extending axially of said cylindrical housing through said second cylindrical insert;

a first air supply duct connected to said upper end of said housing for supplying air to said elongate passage;

a cooling air supply duct connected to said upper end of said housing; and an air outlet at said upper end of said housing;

said air outlet communicating with said cooling air duct through said housing and being directed to discharge cooling air onto a tip of an oxyacetylene torch inserted through said elongate passage.

8. A gas bolt heater as claimed in claim 7, wherein said elongate passage is dimensioned to snugly receive therethrough a tip of an oxy-acetylene torch and has a length sufficient to hold said tip co-axial with said cylindrical chamber.

9. A gas bolt heater as claimed in claim 7, wherein said through opening of said first cylindrical insert includes an upwardly open, downwardly convergently tapered mouth.

10. A gas bolt heater as claimed in claim 7, wherein said air supply duct is provided with a high pressure regulator and a low pressure regulator.

11. A gas bolt heater as claimed in claim 7, including a cooling air passage extending longitudinally of said cylindrical housing, said cooling air passage having one end communicating with said cooling air duct, an air outlet at said lower end of said cylindrical housing, said cooling air passage having an opposite end communicating with said air outlet.

12. A gas bolt heater as claimed in claim 11, including an annular recess extending around said first cylindrical insert and connecting said opposite end of said cooling air passage to said air outlet.

13. A gas bolt heater as claimed in claim 12, including a plurality of downwardly convergent air outlet passages in said second cylindrical insert; said air outlet passages having mouths distributed around said elongate passage at a lower end of said elongate passage; and said first air supply duct communicating with said air outlet passages.

\* \* \* \* \*